Patented July 16, 1940

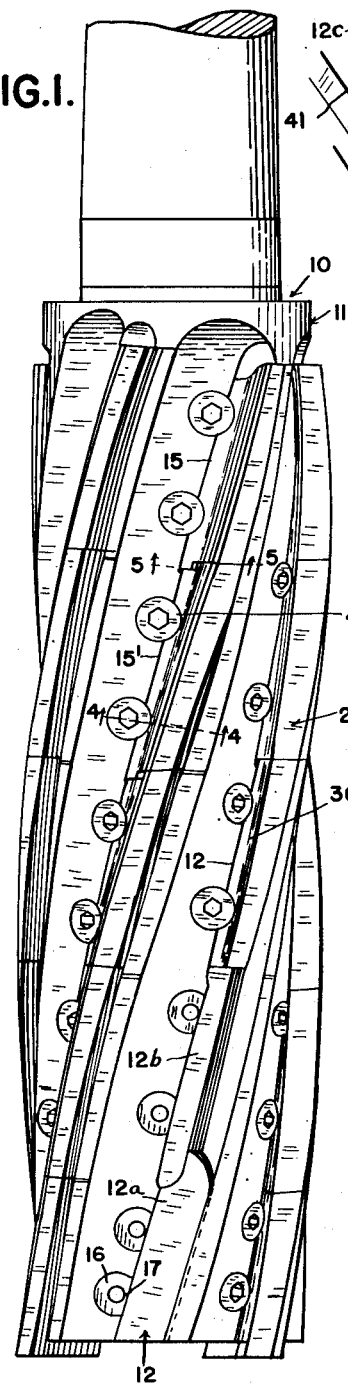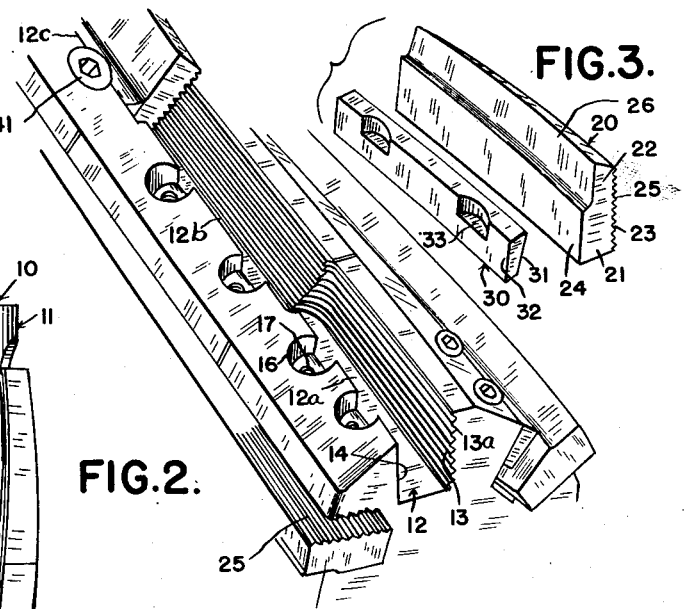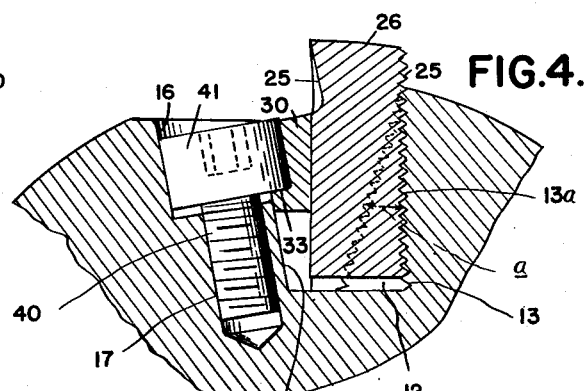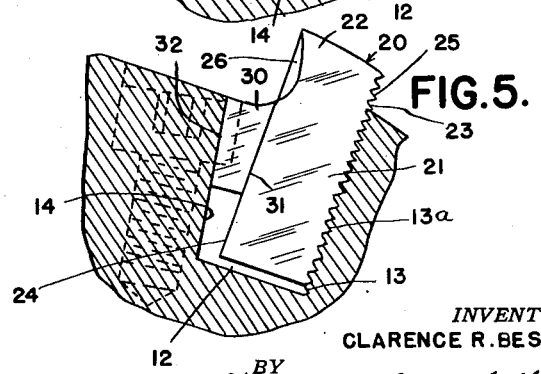

2,207,909

UNITED STATES PATENT OFFICE 2,207,909

MILLING CUTTER

Clarence R. Besaw, Detroit, Mich., assignor to Goddard & Goddard Company, Inc., Detroit, Mich., a corporation of Michigan Application June 13, 1938, Serial No. 213,504

23 Claims. (Cl. 29—105)

This invention relates to milling cutters and more particularly to an inserted blade type cutter.

It is an object of the present invention to provide an inserted blade milling cutter in which each blade is composed of a plurality of abutting sections.

It is a further object of the invention to provide an inserted blade milling cutter in which each blade has a continuous helical cutting portion and in which the blades are provided with angularly related plane sided body portions.

It is a further object of the invention to provide a holder having a continuous blade receiving groove formed therein, said groove occupying a path acutely angular with respect to the axis of rotation but formed by a series of relatively short sections, each circumferentially stepped with relation to the adjacent sections.

It is a further object of the present invention to provide an inserted blade milling cutter in which the cutting portion only of a cutting blade is helical and in which the body portion of the cutting blade is formed by straight line contours to provide outward setting of the blade relative to the holder for resharpening.

It is a further object of the invention to provide a milling cutter comprising an integral holder of circular cross section having a continuous groove formed therein, said groove comprising linear sided angularly related communicating sections, one wall of said groove being serrated in combination with an inserted blade having a helical cutting portion and a generally rectangular body portion, one side of said body portion being serrated to conform to the serrations formed in the groove.

Other objects of the invention will be apparent as the description proceeds, and when taken in conjunction with the accompanying drawing, wherein Fig. 1 is a plan view of my improved milling cutter with two inserted cutting blades removed to illustrate the construction of the groove;

Fig. 2 is an enlarged fragmentary perspective showing the construction of the groove;

Fig. 3 is a perspective showing a blade and a clamping wedge;

Fig. 4 is a fragmentary enlarged section on the line 4—4 of Fig. 1;

Fig. 5 is a fragmentary enlarged section on the line 5—5 of Fig. 1.

The invention disclosed herein primarily concerns itself with the securing of an inserted blade in a milling cutter. It is applicable alike to a solid type tool and to a shell type tool, the latter adapted to be mounted on a separate arbor in use.

In the past, shell type cutters have commonly been formed in sections, a plurality of holder sections being assembled on an arbor and locked together in such manner that the blades of one section line up properly with the blades of another section. According to the teachings of the present invention, it is possible to form the holder portion of a milling tool of a single unitary piece of metal and to form slots therein for the reception of cutting blades, and at the same time to preserve the possibility of radial outward adjustment of the cutting blades to provide for resharpening.

It has been proposed in the past to provide an inserted blade type cutter having helical cutting portions by milling or otherwise forming a helical groove in the holder and by forming the inserted blade or blades of a completely helical shape. A tool of this type is subject to the objection that the cutting blades can not be adjusted radially outward in the helical groove for the purpose of resharpening. This is because the shape of a helix, assuming a constant helix angle varies at different distances from the axis. Therefore if a helical blade is formed to fit exactly a helical groove at a predetermined distance from the axis, it is evident that if the blade is adjusted radially outward, it will no longer conform with the necessary exactness to the contour of the helical groove.

I have found that it is possible to construct a cutter of the type referred to, retaining the advantages inherent in a helical cutting edge and at the same time providing for radial outward adjustment of the cutting blades for resharpening without introducing a departure between the contour of the body portion of the blade and contour of the groove, and maintaining alignment of the cutting edge for full length at all times.

For purposes of illustration I have shown in the drawing a slab milling cutter in which teeth are inserted in slots formed in a solid holder or body portion. It will be evident that this construction is equally applicable, as before stated, to a shell type unitary cutter.

In Fig. 1 is shown the assembled cutter generally indicated at 10 having a generally cylindrical body portion 11. A plurality of grooves 12 are formed by milling or otherwise in the periphery of the holder. As best seen in the perspective fragmentary view of Fig. 2, the continuous groove 12 comprises angularly related, circumferentially stepped, communicating sections 12ª, 12ᵇ and 12ᶜ, etc. It will be understood that any number of sections may be provided, depending upon the length of the tool and the length of the inserted blades desired. The section 12ª of the groove 12 is formed with plane sides 13 and 14 which taper inwardly slightly as best seen in Fig. 4. The generally plane side wall 13 is provided with a plurality of serrations 13ª for a purpose subsequently to be described. Section 12ª is angularly related to the axis of the tool 10 and is also angularly related to the next adjacent section 12ᵇ. The arrangement of these sections is such that the resultant continuous groove is composed of angularly related sections, each section forming an acute angle with the axis of the tool, each section circumferentially stepped, as seen in Figure 1, and each section at an equal angle to the axis of the cutter.

The blade 20 has a body portion 21 which has generally plane sides 23 and 24 and has a cutting portion 22 which is formed on a helix. The body portion 21 is adapted to be received within the groove 12 and a plurality of serrations 25 are formed on one plane surface of the blade to cooperate with the corresponding serrations 13ª formed in the groove. The helical cutter portion 22 of the blade is relieved for proper clearance as at 26 and the forward face is undercut as at 25 to provide the desired rake.

A wedge generally indicated at 30 is provided for holding the blade tightly in the groove with the serrations of the blade cooperating with the serrations of the groove to retain the blade in accurately predetermined relation. The wedge 30 is provided with plane non-parallel sides 31 and 32 and in addition is provided with recesses 33 for a purpose which will presently appear.

The holder is provided with a plurality of recesses 16 which as shown are circular in cross section and which extend into the non-serrated plane side 14 of the groove 12. The bottom of the recess 16 is tapped as at 17 to receive a threaded screw 40.

As best seen in Fig. 4, the blade 20 may be placed in the groove 12 with its serrations 25 cooperating with the serrations 13ª formed on the plane side wall 13 of the groove. The wedge 30 is placed in position, clamping the blade against the serrated side wall of the groove. Screws 40 are then placed in position, the rounded head 41 thereof being received partly within the recesses 16 and being partly received within recesses 33 formed in the wedge member. The screws are screwed inwardly, forcing the wedge 30 tightly between the inclined wall 14 of the groove and the plane wall 24 of the body portion 21 of the blade.

As will be evident, each blade may be inserted directly into the sections where it is to be held and the adjacent sections as 12ª and 12ᵇ are so angularly related that the helical portion 22 of adjacent blades are abutting and form a continuous helical cutting portion.

If it is desired to set out the blades, the screw 40 is removed, the wedge is removed, and the blade 20 is then moved radially outward a distance corresponding to one serration. The parts may then be re-assembled and the blade tightly clamped in assembled position.

It is important to notice at this time that this outward radial adjustment of the individual blades is obtained without sacrificing the accurate surface-to-surface contact between the portions of the blade received in the groove and the corresponding wall of the groove. This is quite different from the condition which would be encountered if the body portion 21 of the inserted blades was helical. If the body portion 21 of the blade was helical and was so shaped as to accurately conform to a helical groove in one position of adjustment, it is evident that the radial outward adjustment of the blade relative to the groove would result in the body portion of the blade no longer accurately conforming to the contour of the associated wall. It is important that the adjacent sections 12ª, 12ᵇ and 12ᶜ be overlapping in the sense that each in its formation shall be continued to a point slightly beyond the position to be occupied by the end of the blade for that section. This permits adjacent blades to be brought into closely abutting relation so that in assembled relation the helical cutting portions 22 of the adjacent blades form in effect a single continuous helical cutting portion.

In forming the grooves 12 it has been found that the various sections may be advantageously milled in the holder portion. For this purpose I preferably provide a stationary milling cutter of a size corresponding to the desired size of the groove. The holder 10 is securely held on a carriage which is adapted to be fed toward and away from the milling cutter. The holder 10 is mounted at an angle to the direction of feed, the angle being selected in accordance with the desired helix angle of the completed cutter. When milling the slot or groove 12ª, it is of course possible to begin the cut with the milling cutter at full depth, thus cutting directly in from the end of the tool. This cut is continued by feeding the carriage toward the milling cutter until a length of slot has been cut slightly in excess of the length of blade to be inserted therein. The carriage is then reversed, and the holder 10 rotated on the carriage an amount best indicated in Fig. 4 by the angle a. The carriage is then fed back under the milling cutter which has been elevated until the milling cutter is in a position proper to initiate the next cut. The milling cutter at this time is fed downwardly into the work to depth at which time the carriage is further translated in a direction to cause the milling cutter to form the next section such as 12ᵇ. As is well illustrated in Fig. 1, near the bottom thereof these two plane sided sections are formed in overlapping relation so as to insure that adjacent inserted blades may be brought into closely abutting relationship. This procedure is continued and additional sections 12ᶜ, etc., are formed. One side wall of the groove 12 is serrated as at 13ª by a serrating cutter.

These plane sided sections 12ª, 12ᵇ and 12ᶜ define generally a path extending at an acute angle to the axis of the holder, but each is a separate, plane sided portion which is angularly related to the adjacent sections. This angular relationship is illustrated in part in Fig. 4, where the angle a illustrates one angle between the plane side walls and is illustrated in part in Fig. 1, where it will be observed that the lines 15, 15′ are also angularly related.

While as before stated this type of construction is applicable both to a solid and shell type of cutter, it is desired at this time to point out one advantage of this type of construction when applied to the solid type cutter. As applied to the solid type cutter it will be apparent that a unitary tool may be made which is of substantially smaller diameter than could be made as a shell type cutter. The shell type cutter must be provided with a central cylindrical bore of a size sufficient to accommodate an arbor for mounting the cutter. The cutter shell must then be sufficiently larger to provide enough material to hold the inserted blade. By making the holder solid, the diameter may be reduced while still retaining the necessary strength. By employing my improved construction, this may be accomplished while retaining the advantages of inserted blades which are radially adjustable for resharpening.

In the claims and elsewhere, the side wall 13 of the groove 12 and the corresponding side wall of the body 21 of blades 20 is described as "occupying" or "defining" a plane, or otherwise shaped surface. It is recognized that a serrated surface is not strictly a plane surface. The language "occupying" or "defining" a plane surface or other surface is therefore to be interpreted as a surface which is basically or fundamentally of the conformation stated, whether further modified by the addition of serrations or other interlock formations or not.

The foregoing detailed description has been given for clearness of understanding only, and no unnecessary limitations should be understood therefrom, but the appended claims should be construed as broadly as permissible in view of the prior art.

What I claim as my invention is:

1. An inserted blade cutter comprising an elongated holder of circular cross section having a continuous groove formed in the periphery thereof, said groove following a path extending at an acute angle to the axis of said holder but comprising sections having inwardly converging side walls defining plane surfaces, one of said walls having parallel serrations, blades in said groove, each blade having a serrated face cooperating with said serrated side wall, and a wedge received between the other face of said blade and the other wall of said section.

2. A tool of the class described, comprising a solid elongated holder of generally circular cross section having a plurality of interconnecting, blade-receiving grooves of substantial depth throughout formed in the periphery thereof, said grooves lying along a path extending at an acute angle to the axis of the holder, each of said grooves having a corresponding side wall which occupies a plane surface.

3. A tool of the class described, comprising an elongated holder of generally circular cross section having a plurality of end overlapping grooves formed in the periphery thereof, said grooves lying along a path extending at an acute angle to the axis of the holder, each of said grooves having a corresponding side wall which occupies a plane surface.

4. A tool of the class described, comprising an elongated holder of generally circular cross section having a plurality of interconnecting, blade-receiving grooves formed in the periphery thereof, said grooves lying along a path extending at an acute angle to the axis of the holder, each of said grooves having a corresponding side wall which occupies a plane surface, said grooves being of a length relative to the diameter of the holder and the angle of said path such that said side wall is of substantial height at each end.

5. A tool of the class described, comprising an elongated holder of generally circular cross section having a plurality of interconnecting, blade-receiving grooves formed in the periphery thereof, said grooves lying along a path extending at an acute angle to the axis of the holder, each of said grooves having a corresponding side wall which occupies a plane surface, said grooves being of a length relative to the diameter of the holder and the angle of said path such that said side wall is of substantial height at each end, and said grooves being located so that said side wall of each groove is of substantially equal height at each end, and locking means for retaining said blades in said grooves.

6. A milling cutter having inserted adjustable blades, comprising an elongated body of generally circular cross section provided with a continuous circumferentially stepped groove, said groove following a path extending at an acute angle to the axis of the holder and composed of individual interconnected, blade-receiving sections, the corresponding wall of each of said sections defining a plane surface, insertable blades for each of said sections, said blades having helically formed cutting edges and lower portions of generally rectangular section receivable in said slots, said lower portion having a side wall defining a plane surface and adapted to abut said side wall of its section and locking means for retaining said blades in said sections.

7. A milling cutter having inserted adjustable blades comprising an elongated body of generally circular cross section provided with a continuous groove, said groove following a path extending at an acute angle to the axis of the holder and composed of independent interconnected sections, the corresponding wall of each of said sections defining a plane surface, said side wall being provided with an interlock formation, insertable blades for each of said sections, said blades having helically formed cutting edges and generally rectangular lower portions receivable in said slots, said lower portion having a side wall defining a plane surface and adapted to abut said side wall of its section, the said side wall of said lower portion being provided with an interlock formation adapted to cooperate with said first mentioned interlock formation.

8. A milling cutter having inserted adjustable blades comprising an elongated body of generally circular cross section provided with a continuous groove, said groove following a path extending at an acute angle to the axis of the holder and composed of independent interconnected sections, the corresponding wall of each of said sections defining a plane surface, said side wall being provided with an interlock formation, insertable blades for each of said sections, said blades having helically formed cutting edges and lower portions receivable in said slots, said lower portion having a side wall defining a plane surface and adapted to abut said side wall of its section, the said side wall of said lower portion being provided with an interlock formation adapted to cooperate with said first mentioned interlock formation at different radial positions of said blades.

9. A milling cutter having inserted adjustable blades comprising an elongated body of generally circular cross section provided with a continuous groove, said groove following a path extending at an acute angle to the axis of the holder and composed of individual interconnected, blade-receiving sections, separate insertable blades for each section, said blades each provided with a helical cutting edge, the body portion of said blades and said sections being provided with cooperating surfaces adapted to abut substantially continuously throughout their overlapping extent in various radial positions of adjustment of said blades, and locking means for retaining said blades in said various positions of adjustment.

10. A milling cutter having inserted adjustable blades comprising an elongated body of generally circular cross section provided with a continuous groove, said groove following a path extending at an acute angle to the axis of the holder and composed of independent interconnected sections, separate insertable blades for each section, said blades each provided with a helical cutting edge, the body portion of said blades and said sections being provided with surfaces adapted to abut substantially continuously throughout their overlapping extent in various radial positions of adjustments of said blades, and securing means for retaining said blades with said surfaces firmly in contact at various positions of adjustment.

11. A milling cutter having inserted adjustable blades comprising an elongated body of generally circular cross section provided with a continuous groove, said groove following a path extending at an acute angle to the axis of the holder and composed of independent interconnected sections, the corresponding wall of each of said sections defining a plane surface, said side wall being serrated, insertable blades for each of said sections, said blades having helically formed cutting edges and having body portions of generally rectangular section receivable in said slots, said body portions having a side wall defining a plane surface and adapted to abut said side wall of its section, the said side wall of said body portion being similarly serrated.

12. A tool comprising an elongated cylindrical holder having a continuous groove formed therein, said groove having one wall comprising separate areas, each occupying a surface defined by parallel generally radial elements, the parallel elements of each area being angularly related to the parallel elements of the adjacent area, and all forming equal angles with the axis of said holder.

13. A cutting tool having an inclined curved cutting edge provided thereon comprising a holder of circular cross section, a continuous slot composed of a plurality of end overlapping sections, all of which lie in a curved, inclined path, each section having a side wall defining a surface all elements of which are parallel straight line elements extending from top to bottom of said slot, an insertable blade for each section, the lower part of each blade having a wall adapted to conform precisely to the said side wall of its section, said sections being of slightly greater length than said blades to provide for endwise adjustment of said blades into abutment with adjacent blades.

14. A cutting tool having an inclined curved cutting edge provided thereon comprising a holder of circular cross section, a continuous slot occupying a curved, inclined path and composed of a plurality of end overlapping sections, each section having a side wall defining a plane surface, an insertable blade for each section, the lower part of each blade having a wall adapted to conform precisely to the said side wall of its section, said sections being of slightly greater length than said blades to provide for endwise adjustment of said blades into abutment with adjacent blades.

15. A blade adapted to be used in a cylindrical holder having a continuous sectional slot, each section of which has a side wall occupying a plane surface, and in which adjacent sections are circumferentially stepped and angularly related to each other and to the axis of said holder; said blade having a body portion provided with a side wall occupying a plane surface, and a cutting portion formed as a true helix.

16. A milling cutter having a body portion provided with continuous angular slots composed of relatively short portions, each of which is in a different radial plane from the others, blades having helical cutting lips located in said portions of said slots, said slots and said blades being provided with cooperating surfaces adapted to engage in substantial surface to surface contact in various radial positions of said blades, the sections of said slots being angularly related as aforesaid so as to retain said helical cutting lips of a full series of blades substantially in one continuous and unbroken helix in all positions of radial adjustment, similar to the helical tooth milled in a solid cutter of equivalent dimensions.

17. A tool of the class described, comprising an elongated holder of generally circular cross section having a continuous groove of substantial depth throughout formed in the periphery thereof, said groove following a path extending at an acute angle to the axis of said holder but comprising individual blade-receiving sections, one side wall of each section occupying a plane surface.

18. An inserted blade cutter comprising an elongated holder of circular cross section having a continuous groove of substantial depth throughout formed in the periphery thereof, said groove following a path extending at an acute angle to the axis of said holder but comprising individual blade-receiving sections each of which has a side wall occupying a plane, blades having a body, one side of which occupies a plane and is adapted to abut the said side wall of a section of said groove whereby said blades may be radially adjustable and retain firm surface contact with a side wall of said groove in various positions of adjustment, and locking means for clamping said blades in contact with said side wall.

19. An inserted blade cutter comprising an elongated holder of circular cross section having a continuous groove of substantial depth throughout formed in the periphery thereof, said groove following a path extending at an acute angle to the axis of said holder but comprising overlapping, individual blade-receiving sections each having a side wall occupying a surface composed of parallel generally radial lines, blades having a body, one side of which is also a surface composed of parallel lines and is adapted to abut the said side wall of a section of said groove, said blades being in end abutting relation, said blades being of generally rectangular section but having helically formed cutting edges thereon, said sections of said groove being angularly related such that said helically formed cutting edges of abutting blades form a continuous helix, and means for clamping said blades in contact with said side wall.

20. An inserted blade milling cutter comprising a holder, an inserted blade of generally rectangular section comprising a plurality of abutting blade sections, the cutting portions of said blade sections forming a continuous helical cutting portion, said holder being provided with a continuous groove, said blade sections having body portions, said groove and body portions being formed to provide substantially continuous surface to surface contact over a substantial area in different radial positions of adjustment of said sections relative to said holder, and locking means for clamping said blade sections in said groove in various positions of adjustment.

21. A milling cutter holder for inserted adjustable blades comprising an elongated body of generally circular cross section provided with a continuous groove, said groove following a path extending at an acute angle to the axis of the holder and composed of individual, interconnected blade-receiving sections, the corresponding side walls of each of said sections occupying a surface formed of straight, parallel generally radial lines.

22. A milling cutter having inserted adjustable blades comprising an elongated body of generally circular cross section provided with a continuous groove, said groove following a path extending at an acute angle to the axis of the holder and composed of individual, interconnected blade-receiving sections, the corresponding side walls of each of said sections occupying a surface formed of straight, parallel generally radial lines, an insertable blade for each section having a helically formed cutting portion and a lower portion having a surface conforming to the said surface of its section in various radial positions of adjustment, and means for locking said blades in place in said grooves in various radial positions of adjustment.

23. A tool comprising an elongated cylindrical holder having a continuous groove formed therein, said groove having one wall comprising separate areas, each occupying a surface formed of straight, parallel, generally radial lines, the parallel lines of each area being angularly related to the parallel lines of the adjacent area.

CLARENCE R. BESAW.